(12) United States Patent
Ogino et al.

(10) Patent No.: US 7,648,737 B2
(45) Date of Patent: Jan. 19, 2010

(54) STRETCHED LAMINATE FILM AND METHOD OF PRODUCING THE SAME

(75) Inventors: Yasushi Ogino, Omitama (JP);
Masahiro Yamasaki, Omitama (JP);
Hideaki Tanaka, Omitama (JP)

(73) Assignee: Kureha Corporation, Tokyo (JP)

( * ) Notice: Subject to any disclaimer, the term of this patent is extended or adjusted under 35 U.S.C. 154(b) by 270 days.

(21) Appl. No.: 10/576,878

(22) PCT Filed: Oct. 19, 2004

(86) PCT No.: PCT/JP2004/015767

§ 371 (c)(1),
(2), (4) Date: Apr. 21, 2006

(87) PCT Pub. No.: WO2005/037547

PCT Pub. Date: Apr. 28, 2005

(65) Prior Publication Data

US 2007/0042208 A1    Feb. 22, 2007

(30) Foreign Application Priority Data

Oct. 22, 2003   (JP) .............................. 2003-362536

(51) Int. Cl.
*B05D 1/40*   (2006.01)
(52) U.S. Cl. ..................................... 427/331
(58) Field of Classification Search ............... None
See application file for complete search history.

(56) References Cited

U.S. PATENT DOCUMENTS

| 5,439,745 | A * | 8/1995 | Ohba et al. ................. 428/412 |
| 6,605,344 | B1 | 8/2003 | Ohba et al. |

FOREIGN PATENT DOCUMENTS

| EP | 99913656.7 | 4/1999 |
| EP | 1086981 A1 | 3/2001 |
| JP | 09-036535 | 2/1997 |
| JP | 09-127554 | 5/1997 |
| JP | 10-316779 | 5/1997 |
| JP | 09-240838 | 9/1997 |
| JP | 09-256216 | 9/1997 |
| JP | 10-206485 | 7/1998 |
| JP | 2000-037822 | 7/1998 |
| JP | 2000-000931 | 4/1999 |
| WO | WO99/52973 | 4/1999 |

OTHER PUBLICATIONS

International Search Report for PCT/JP2004/015767.
International Search Report for PCT/JP2004/015767, dated Feb. 8, 2005.

* cited by examiner

*Primary Examiner*—Sheeba Ahmed
(74) *Attorney, Agent, or Firm*—Reed Smith LLP; Nanda P. B. A. Kumar

(57) ABSTRACT

The present invention provides a stretched laminate film with oxygen-gas barrier properties which includes a layer (a) formed from a composition of a polycarboxylate-based polymer (A) and a plasticizer (B), a layer (c) containing a multivalent metal compound (C) and a layer (b) formed from a thermoplastic resin, which film includes at least one layer forming unit where the layer (a) and the layer (c) are adjacent to each other, and in which film at least the layer (a) and the layer (b) are stretched with a surface stretch ratio of 1.1 to 100. By means of carrying out an applying step and a stretching step according to a production method of the present invention, the layer formed from the polycarboxylate-based polymer including the plasticizer can be made thinner, although making the layer thinner has been difficult to achieve as long as only the application is carried out.

6 Claims, No Drawings

STRETCHED LAMINATE FILM AND METHOD OF PRODUCING THE SAME

TECHNICAL FIELD

The present invention relates to a stretched laminate film including a layer made of a mixture of a polycarboxylate-based polymer and a plasticizer, a layer made of a multivalent metal compound, and a layer made of a thermoplastic resin, as well as a method of producing the stretched laminate film. More specifically, the present invention relates to the stretched laminate film in which, when the stretched laminate film is going to be produced, at least the layer made of the mixture of the polycarboxylate-based polymer and the plasticizer as well as the layer made of the thermoplastic resin are stretched by means of applying the layer made of the mixture of the polycarboxylate-based polymer and the plasticizer to the layer made of the thermoplastic resin, and thereafter stretching the laminate film obtained by the application. In addition, the present invention relates to the method of producing the stretched laminate film.

BACKGROUND ART

Polymers represented by poly(meth)acrylic acid and polyvinyl alcohol contain in the molecules a group which is highly hydrophilic, and which readily forms a hydrogen bond. Such polymers have been publicly known as gas barrier polymers. Although, however, a film formed solely from such polymers exhibits excellent gas barrier properties against oxygen and the like under dry conditions, the film exhibits poor gas barrier properties against oxygen and the like under highly humid conditions due to hydrophilic nature of the polymers. In addition, such polymers have a problem with their resistance against moisture and hot water, since the polymers dissolve in hot water, and for other reasons. The poor resistance of such polymers against moisture and hot water has imposed restrictions on industrial use of the polymers as gas barrier resins.

Patent Literature 1 (claim 1 of Japanese Unexamined Patent Application Publication No. Hei. 10-316779) has proposed a method of producing a coating film in the following manner. Aqueous coating liquid containing at least a poly(meth)acrylic acid polymer, a polyalcohol polymer and an aqueous medium is applied to at least one surface of a film to be coated with the coating liquid. Thus, a coated film formed by arranging the coat layer on surface of the film to be coated with the coating liquid is fabricated. The coated film is stretched under heated conditions while the aqueous solvent exists in the coat layer.

Patent Literature 2 (claim 1 of Japanese Unexamined Patent Application Publication No. 2000-37822) has proposed another method of producing a coating film in the following manner. Aqueous coating liquid containing at least a poly(meth)acrylic acid polymer, a polyalcohol polymer, a plasticizer and an aqueous medium is applied to at least one surface of a film to be coated with the coating liquid. Thus, a coated film formed by arranging the coat layer on surface of the film to be coated with the coating liquid is fabricated. The coated film is stretched under heated conditions while the plasticizer exists in the coat layer.

Patent Literature 3 (Japanese Unexamined Patent Application Publication No. Hei. 10-231434) has proposed a composition formed from a carboxyl group containing resin which readily forms a hydrogen bond (specifically, a poly(meth)acrylic acid polymer), a hydroxyl group containing resin which readily forms a hydrogen bond (specifically, saccharides) and an inorganic layered compound.

Patent Literature 4 (Japanese Unexamined Patent Application Publication No. Hei. 10-237180) has proposed a resin composition containing a reaction product formed from a poly(meth)acrylic acid polymer, a polyalcohol polymer and a multivalent metal. Patent Literature 4 has disclosed that the resin composition is a gas barrier resin composition characterized by including, in the chemical structure, ester bonds formed through a reaction between the poly(meth)acrylic acid and the polyalcohol and ionic bonds formed between the poly(meth)acrylic acid and the multivalent metal ions. Patent Literature 4 has also disclosed that the mixture of the poly(meth)acrylic acid polymer and the polyalcohol polymer needs to be denatured by means of heat treatment or the like in order to sufficiently develop the oxygen-gas barrier properties and the resistance against high-temperature water vapor, hot water and the like.

Patent Literature 5 (Japanese Unexamined Patent Application Publication No. 2000-931) has proposed a film produced by applying a layer containing a metal compound on the surface of a molded product layer formed from a poly(meth)acrylic acid polymer and a polyalcohol polymer. Patent Literature 5 has disclosed that the aforementioned method makes it possible to easily obtain a film with enhanced gas barrier properties against oxygen and the like and an enhanced resistance against high-temperature water vapor and hot water.

However, Patent Literatures 4 and 5 have disclosed that the mixture of the poly(meth)acrylic acid polymer and the polyalcohol polymer needs to be denatured by means of heat treatment or the like in order to sufficiently develop the oxygen-gas barrier properties and the resistance against high-temperature water vapor, hot water and the like. In a case where the mixture is not sufficiently denatured, the existence of the polyalcohol in the mixture causes the obtained film to exhibit insufficient oxygen-gas barrier properties and insufficient resistance against high-temperature water vapor and hot water in spite of act of the multivalent metal compound. Furthermore, the Patent Literatures 4 and 5 have disclosed nothing about a stretched film which would be formed from the composition described in the literatures.

An object of the present invention is to provide the following stretched laminate film with oxygen-gas barrier properties and a method of producing the stretched laminate film. When a layer forming unit is defined as a unit where a layer formed from a polycarboxylate-based polymer containing a plasticizer and a layer containing a multivalent metal compound are adjacent to one another, the stretched laminate film includes a layer formed from a layer formed from a thermoplastic resin and at least one layer forming unit. In addition, in the stretched laminate film, at least the layer formed from the thermoplastic resin and the layer formed from the polycarboxylate-based polymer containing the plasticizer in the aforementioned layer forming unit are stretched.

DISCLOSURE OF THE INVENTION

When a layer forming unit is defined as a unit where a layer formed from the composition of the polycarboxylate-based polymer and the plasticizer as well as the layer containing the multivalent metal compound are adjacent to one another, the present inventors have found that a sheet made of a laminate film including at least one layer forming unit and the thermoplastic resin as well as a laminate film obtained by laminating layers of films can be stretched. Furthermore, the present inventors have found that the stretched laminate film thus obtained exhibits excellent oxygen-gas barrier properties. Accordingly, the present inventors have completed the present invention.

In other words, a first aspect of the present invention provides a stretched laminate film with oxygen-gas barrier properties, which is a laminate including a layer (a) formed from a composition of a polycarboxylate-based polymer (A) and a plasticizer (B), a layer (c) containing a multivalent metal compound (C) and a layer (b) formed from a thermoplastic resin. The stretched laminate film is characterized by including at least one layer forming unit where the layers (a) and (c) are adjacent to each other, and characterized in that at least the layers (a) and (b) are stretched with a surface stretch ratio of 1.1 to 100.

A second aspect of the present invention provides the stretched laminate film according to the first aspect of the present invention, in which a composition mass ratio of the polycarboxylate-based polymer (A) to the plasticizer (B) is 99.9/0.1 to 70/30.

A third aspect of the present invention provides the stretched laminate film according to any one of the first and second aspects of the present invention, in which the plasticizer (B) is polyalcohol.

A fourth aspect of the present invention is to provide a method of producing a stretched laminate film, which includes a layer (a) formed from a composition of a polycarboxylate-based polymer (A) and a plasticizer (B), a layer (c) containing a multivalent metal compound (C) and a layer (b) formed from a thermoplastic resin, and which includes at least one layer forming unit where the layers (a) and (c) are adjacent to each other. The production method is a method of producing a stretched laminate film with oxygen-gas barrier properties, the method including the steps of: superposing at least one of the layers (a) and (c) on at least one surface of the layer (b); and stretching the laminate film including the layers (a) and (b).

A fifth aspect of the present invention provides the method of producing a stretched laminate film according to the fourth aspect of the present invention, in which the superposition is carried out by means of coating.

A sixth aspect of the present invention provides the method of producing a stretched laminate film according to any one of the fourth and fifth aspects of the present invention, in which the laminate film is stretched with a surface stretch ratio of 1.1 to 100 in the stretching step.

A seventh aspect of the present invention provides the method of producing a stretched laminate film according to any one of the fourth and sixth aspects of the present invention, in which a composition mass ratio of the polycarboxylate-based polymer (A) to the plasticizer (B) is 99.9/0.1 to 70/30.

An eighth aspect of the present invention provides the method of producing a stretched laminate film according to any one of the fourth and seventh aspects of the present invention, in which the plasticizer (B) is polyalcohol.

A ninth aspect of the present invention provides the method of producing a stretched laminate film according to any one of the fourth and eighth aspects of the present invention, in which the laminate is stretched after the layer (c) is applied to a surface obtained by applying the layer (a) to the layer (b), or after the layer (a) is applied to a surface obtained by applying the layer (c) to the layer (b).

A tenth aspect of the present invention provides the method of producing a stretched laminate film according to any one of the fourth and eighth aspects of the present invention, in accordance with which at least one of the layer (a) and the layer (c) is applied to at least one surface of the layer (b) formed of an unstretched thermoplastic resin which has been melted and extruded, and a laminated film obtained by the application is stretched in one direction. In accordance with the method, in a case where the layer (a) is applied thereto, the layer (c) which is adjacent to the layer (a), and which, along with the layer (a), constitutes the layer forming unit, is subsequently applied to the applied layer (a), and then is stretched in a direction perpendicular to the aforementioned direction in which the layer (a) has been stretched. In a case where the layer (c) is applied thereto, the layer (a) which is adjacent to the layer (c), and which, along with the layer (c), constitutes the layer forming unit, is subsequently applied to the applied layer (c), and then is stretched in a direction perpendicular to the aforementioned direction in which the layer (c) has been stretched.

An eleventh aspect of the present invention provides the method of producing a stretched laminate film according to any one of the fourth and eighth aspects of the present invention, in accordance with which at least one of the layer (a) and the layer (c) is applied to at least one surface of the layer (b) formed of a thermoplastic resin which has been stretched in only one direction after being melted and extruded, and a laminate film obtained by the application is stretched in a direction perpendicular to the direction in which the layer (b) has been stretched. According to the method, in a case where the layer (a) is applied thereto, the layer (c) which is adjacent to the layer (a), and which, along with the layer (a), constitutes the layer forming unit, is applied to the applied layer (a). In a case where the layer (c) is applied thereto, the layer (a) which is adjacent to the layer (c), and which, along with the layer (c), constitutes the layer forming unit, is applied to the applied layer (c).

A twelfth aspect of the present invention provides the method of producing a stretched laminate film according to any one the fourth and eighth aspects of the present invention, in accordance with which the layers (a) and (c) are applied to at least one surface of the layer (b) formed of an unstretched thermoplastic resin which has been melted and extruded, and thereafter a laminate film obtained by the application is stretched in a direction in which the film runs, and in a direction perpendicular to the running direction at the same time.

A thirteenth aspect of the present invention provides the method of producing a stretched laminate film according to any one of the fourth and eighth aspects of the present invention, in accordance with which the layer (a) is applied to at least one surface of the layer (b) formed of an unstretched thermoplastic resin which has been melted and extruded, thereafter a laminate film obtained by the application is stretched in a direction in which the film runs, and in a direction perpendicular to the running direction at the same time, and subsequently the layer (c) is applied to the surface of the applied layer (a).

A fourteenth aspect of the present invention provides the method of producing a stretched laminate film according to any one of the fourth and thirteenth aspects of the present invention, in accordance with which the application of the layers (a) and (c) to the layer (b) which has been melted and extruded as well as the stretching of a laminated film obtained by the application are performed in an integrated process.

BEST MODES FOR CARRYING OUT THE INVENTION

Detailed descriptions will be provided below for the present invention.

The present invention provides a laminate including a layer (a) formed from a composition of a polycarboxylate-based polymer (A) and a plasticizer (B), a layer (c) containing a multivalent metal compound (C) and a layer (b) formed from a thermoplastic resin. The laminate is a stretched laminate film with oxygen-gas barrier properties, the stretched laminate film including at least one layer forming unit where the layers (a) and (c) are adjacent to each other. In the stretched laminate film, at least the layers (a) and (b) are stretched with a surface stretch ratio of 1.1 to 100. In addition, the present invention provides a method of producing the aforementioned film.

Descriptions will be provided below for materials forming the layer (a) according to the present invention.

No specific restrictions are imposed on the polycarboxylate-based polymer (A) as long as the polycarboxylate-based polymer (A) is an existing polycarboxylate-based polymer. With regard to the polycarboxylate-based polymer (A) serving as the materials for the layer (a), however, it is desirable that a coefficient of the oxygen permeability obtained by measuring a film formed solely from the polycarboxylate-based polymer (A) under dry conditions (at 30° C. at a relative humidity of 0%) be not larger than 1000 $cm^3$ (STP)·μm/($m^2$·day·MPa) from viewpoints of gas barrier properties and stability against high-temperature water vapor and hot water of a gas barrier film according to the present invention. It is more desirable that the coefficient of the oxygen permeability be not larger than 500 $cm^3$ (STP)·μm/($m^2$·day·MPa). It is the most desirable that the coefficient of the oxygen permeability be not larger than 100 $cm^3$ (STP)·μm/($m^2$·day·MPa).

The coefficient of the oxygen permeability as herein mentioned can be found, for example, by use of the following procedure.

First of all, the polycarboxylate-based polymer (A) is dissolved in water, and thus an aqueous solution containing 10 mass percent of the polycarboxylate-based polymer (A) is prepared. Then, the aqueous solution thus prepared is applied onto a substrate made of a plastic by use of a bar coater, and is dried.

Thereby, a coating film on which a 1 μm-thick layer of the polycarboxylate-based polymer is formed is prepared. The coating film thus obtained is dried, and the oxygen permeability is measured at 30° C. at the relative humidity of 0%. At this point, an arbitrary plastic film having an already-known oxygen permeability is used as the plastic substrate. If the oxygen permeability of the coating film containing the polycarboxylate-based polymer (A) thus obtained is not larger than one tenth of the oxygen permeability solely of the plastic film used as the substrate, the measured value of the oxygen permeability of the coating film can be virtually regarded as the oxygen permeability solely of the layer of the polycarboxylate-based polymer (A).

Furthermore, since the value thus found represents the oxygen permeability of the 1 μm-thick layer of the polycarboxylate-based polymer (A), the value can be converted to the coefficient of the oxygen permeability by means of multiplying the value by the thickness of 1 μm.

Existing polycarboxylate-based polymers can be used as the polycarboxylate-based polymer (A) to be used in the case of the present invention. The term "existing polycarboxylate-based polymers" is a generic designation of polymers, each of which includes two or more carboxyl groups in its molecule. Specifically, the followings can be taken as examples of the polycarboxylate-based polymers: homopolymers formed from an α,β-monoethylenic unsaturated carboxylic acid serving as a polymerizable monomer; copolymers formed solely from α,β-monoethylenic unsaturated carboxylic acids serving as monomer components and containing at least two types of these components; copolymers formed from an α,β-monoethylenic unsaturated carboxylic acid monomer and another ethylenic unsaturated monomer; and acidic polysaccharides including in the molecules a carboxyl group, such as alginic acid, carboxymethyl cellulose and pectin. These polycarboxylate-based polymers (A) can be used singly or in combination of at least two types of them.

In this respect, typical examples of the α,β-monoethylenic unsaturated carboxylic acid include acrylic acid, methacrylic acid, itaconic acid, maleic acid, fumaric acid and crotonic acid. In addition, typical examples of the ethylenic unsaturated monomer capable of being copolymerized with such an α,β-monoethylenic unsaturated carboxylic acid include ethylene, propylene, saturated carboxylic acid vinyl esters such as vinyl acetate, alkyl acrylates, alkyl methacrylates, alkyl itaconates, acrylonitrile, vinyl chloride, vinylidene chloride, vinyl fluoride, vinylidene fluoride and styrene. In a case where the polycarboxylate-based polymer (A) is a copolymer formed from an α,β-monoethylenic unsaturated carboxylic acid and one of saturated carboxylic acid vinyl esters such as vinyl acetate, the copolymer can be used by means of converting the saturated carboxylic acid vinyl ester moiety to vinyl alcohol through saponification of the copolymer.

Furthermore, in a case where the polycarboxylate-based polymer (A) used in the present invention is a copolymer formed from an α,β-monoethylenic unsaturated carboxylic acid and an ethylenic unsaturated monomer, it is desirable that, with regard to the copolymer composition, the compositional proportion of the α,β-monoethylenic unsaturated carboxylic acid monomer in the copolymer be not smaller than 60 mol % from viewpoints of the oxygen-gas barrier properties and the resistance against high-temperature water vapor and hot water of the stretched laminate film according to the present invention. It is more desirable that the compositional proportion be not smaller than 80 mol %. It is far more desirable that the compositional proportion be not smaller than 90 mol %. It is the most desirable that the compositional proportion be 100 mol %, that is, that the polycarboxylate-based polymer (A) be a polymer formed solely from the α,β-monoethylenic unsaturated carboxylic acid. Moreover, in a case where the polycarboxylate-based polymer (A) is a polymer formed solely from the α,β-monoethylenic unsaturated carboxylic acid, desirable examples of the polycarboxylate-based polymer (A) include polymers formed through polymerization of at least one type of polymerizable monomer selected from the group consisting of acrylic acid, methacrylic acid, itaconic acid, maleic acid, fumaric acid and crotonic acid, as well as mixtures of such polymers. It is more desirable that a homopolymer, a copolymer, and/or a mixture of the homopolymer and the copolymer, which contains at least one type of polymerizable monomer selected from the group consisting of acrylic acid, methacrylic acid and maleic acid be able to be used. It is the most desirable that polyacrylic acid, polymethacrylic acid, polymaleic acid and mixtures of the acids be able to be used. In a case where the polycarboxylate-based polymer (A) is other than a polymer formed from the α,β-monoethylenic unsaturated carboxylic acid monomer, and is, for example, an acidic polysaccharide, it is desirable that alginic acid be able to be used.

No specific restrictions are imposed on the number average molecular weight of the polycarboxylate-based polymer (A). From a viewpoint of the film formability, however, it is desirable that the number average molecular weight be in a range of 2,000 to 10,000,000. It is more desirable that the number average molecular weight be in a range of 5,000 to 1,000,000.

In the case of the present invention, the layer (a) is formed of the composition of the polycarboxylate-based polymer (A) and the plasticizer (B). The plasticizer (B) used in the case of the present invention can be selected from publicly-known plasticizers whenever deemed necessary. Polyalcohols are desirably used as the plasticizer (B) to be used in the case of the present invention. Specific examples of the plasticizer (B) used in the case of the present invention include glycols such as ethylene glycol, trimethylene glycol, propylene glycol, tetramethylene glycol, 1,3-butanediol, 2,3-butanediol, pentamethylene glycol, hexamethylene glycol, diethylene glycol, triethylene glycol, polyethylene glycol, polyethylene oxide; sorbitol; mannitol; dulcitol; erythritol; glycerin; lactic acids; and fatty acids. These can be used in the form of a mixture whenever deemed necessary. Incidentally, it is more desirable that, out of the aforementioned examples, glycerin, ethylene glycol, polyethylene glycol and the like be used as the plasticizer (B) from viewpoints of the stretchability and the gas barrier properties. The plasticizer (B) is mixed with the polycarboxylate-based polymer (A). With regard to the compositional ratio (mixture ratio) of the polycarboxylate-based polymer (A) to the plasticizer (B), it is desirable that a mass ratio of the polycarboxylate-based polymer (A) to the plasticizer (B) be 99.9/0.1 to 70/30. It is more desirable that the mass ratio be 99/1 to 80/20. It is particularly desirable that the mass ratio be 95/5 to 85/15. It is desirable that the mass ratio of the plasticizer to the polycarboxylate-based polymer be in the aforementioned range, since the mass ratio makes the stretchability and the gas barrier properties compatible. The polycarboxylate-based polymer (A) in the layer (a) along with the multivalent metal compound (C) in the layer (c) forms a salt so that the polycarboxylate-based polymer (A) develops stable gas barrier properties. Moreover, existence of the plasticizer (B) in the layer (a) causes the layer (a) to follow the stretch of layer (b) formed from the thermoplastic resin, accordingly the existence helps the layer (c) to be stretched.

Descriptions will be provided for materials constituting the layer (c) containing the multivalent metal compound (C) according to the present invention.

The layer (c) is formed from the multivalent metal compound (C). The multivalent metal compound (C) includes a multivalent metal element whose metal ions have two or more valencies, and a compound of such a multivalent metal element. It is desirable that a divalent metal compound be used as the multivalent metal compound (C) from viewpoints of the gas barrier properties, the resistance against high-temperature water vapor and hot water, and easiness-to-produce of the stretched laminate film according to the present invention. When a chemical equivalent ratio (Ct/At) of a total amount (Ct) of the multivalent metal compound (C) to a total amount (At) of the carboxyl groups is intended to be found, the reference is the total amount (Ct) representing the sum of amounts of the multivalent metal compound contained respectively in all the layers (c) and the total amount (At) representing the sum of amounts of the carboxyl groups contained respectively in all the layers (a). It is desirable that the reference be the total amount (Ct) representing an amount of the multivalent metal compound contained in the layer (c) adjacent to the layer (a) and the total amount (At) representing an amount of the carboxyl groups contained in layer (a) adjacent to the layer (c). In addition, it is desirable that the chemical equivalent ratio be not smaller than 0.2. It is more desirable that the chemical equivalent ratio be not smaller than 0.5 but not larger than 10. It is far desirable that the chemical equivalent ratio be in a range of 0.8 to 5 not only from the aforementioned viewpoints, but also from viewpoints of formability and transparency of the film.

Specific examples of the multivalent metal include alkaline earth metals such as beryllium, magnesium, calcium and the like; transition metals such as titanium, zirconium, chromium, manganese, iron, cobalt, nickel, copper, zinc and the like; aluminum and the like. Specific examples of the multivalent metal compound include oxides, hydroxides, carbonates, organic acid salts and inorganic acid salts of the aforementioned multivalent metals; ammonium complexes of the multivalent metals; secondary to quaternary amine complexes of the multivalent metals; and carbonates and organic acid salts of such complexes. Examples of the organic acid salts include acetates, oxalates, citrates, lactates, phosphates, phosphites, hypophosphites, stearates and monoethylenic unsaturated carboxylic acid salts. Examples of the inorganic acid salts include chlorides, sulfates, nitrates and the like. Other examples of the multivalent metal compound include alkyl alkoxides of the aforementioned multivalent metals.

Furthermore, a metal compound formed from a monovalent metal, for example, a monovalent metal salt of the polycarboxylate-based polymer can be used while being mixed with, or contained in, the stretched laminate film according to the present invention, as long as neither the gas barrier properties nor the resistance against high-temperature water vapor and hot water of the film according to the present invention is impaired. With regard to the amount of a monovalent metal compound to be added, it is desirable that the chemical equivalent of the monovalent metal compound relative to the carboxyl groups of the polycarboxylate-based polymer (A) be not larger than 0.2, from viewpoints of the gas barrier properties and the resistance against high-temperature watervapor and hot water of the stretched laminate film according to the present invention. The monovalent metal compound may be partially contained in the molecule of a multivalent metal salt of the polycarboxylate-based polymer.

No specific restrictions are imposed on the form of the multivalent metal compound (C). As described below, however, in a sheet and film constituting the stretched laminate film according to the present invention, parts or all of the multivalent metal compound (C) and carboxyl groups of the polycarboxylate-based polymer (A) form a salt and ionic bonds. For this reason, it is desirable that the multivalent metal compound (C) be in the form of particles, and that the particle sizes be smaller, from the viewpoint of the transparency of a multilayered film constituting the stretched laminate film according to the present invention, in a case where the film contains parts of the multivalent metal compound (C) which do not participate in formation of a carboxylic acid salt. Moreover, it is also desirable that the multivalent metal compound be in the form of particles, and that the particle sizes be smaller, from a viewpoint that the below-described coating mixture for forming the multilayered film constituting the stretched laminate film according to the present invention is prepared efficiently, and from a viewpoint that a more homogeneous coating mixture is obtained. It is desirable that the average particle size of the multivalent metal compound be not larger than 5 μm. It is more desirable that the average particle size be not larger than 1 μm, and it is the most desirable that the average particle size be not larger than 0.1 μm.

The multivalent metal compound (C) constituting in the layer (c) in the case of the present invention can be suitably used together with a resin, such as a thermoplastic resin and a thermosetting resin, which is used for coating materials. Specific examples of such a resin include alkyd resin, amino alkyd resin, melamine resin, acrylic resin, nitrocellulose, urethane resin, polyester resin, phenolic resin, amino resin, fluorocarbon resin, silicone resin, epoxy resin, vinyl resin, cellulosic-based resin and natural resin. Incidentally, a hardener can be used whenever deemed necessary, and publicly-known resins such as melamine resin, polyisocyanate and polyamine can be cited.

With regard to a mixture ratio of the multivalent metal compound (C) and the aforementioned resin, it is desirable that a mass ratio of the multivalent metal compound (C) to the resin be 1/100 to 10/1. It is more desirable that the mass ratio be 1/10 to 5/1. It is the most desirable that the mass ratio be 1/5 to 2/1. It is desirable that the mass ratio be in these range from a viewpoint that the stretching formability and the oxygen-gas barrier properties are compatible with each other. The layer (c) formed from the multivalent metal compound (C) or from a mixture of the multivalent metal compound (C) and the resin is formed in the following manner. If the layer (c) is formed from the multivalent metal compound (C), the multivalent metal compound (C) is dispersed or dissolved in a solvent, and thereafter the multivalent metal compound (C) thus dispersed or dissolved is applied thereto. If the layer (c) is formed from the mixture of the multivalent metal compound (C) and the resin, the multivalent metal compound (C) and the resin are dispersed or dissolved in a solvent, and thereafter the multivalent metal compound (C) and the resin thus dispersed or dissolved are applied thereto. Examples of the solvent to be used include water; alcohols such as methyl alcohol, ethyl alcohol, isopropyl alcohol, n-propyl alcohol, n-butyl alcohol and n-pentyl alcohol; dimethyl sulfoxide; dimethylformamide; dimethylacetamide; toluene; hexane; heptane; siloxane; acetone; methyl ethyl ketone; diethyl ether; dioxane; tetrahydrofuran; ethyl acetate; butyl acetate and the like. Furthermore, an additive, such as a plasticizer, a stabilizer, a film-forming agent, an anti-blocking agent and a surfactant can be added to the coating liquid whenever deemed necessary as long as the properties of the coating liquid are not impaired.

With regard to the arrangement of the layers (a) and (c) in the stretched laminate film, the layer structure needs to include at least one layer forming unit (a)/(c) where the layers (a) and (c) are adjacent to each other in order that the carboxyl groups of the polycarboxylate-based polymer (A) in the layer (a) and the multivalent metal compound (C) in the layer (c) form ionic bonds. In addition, it is desirable that the layer structure be required to include at least one layer forming unit (c)/(a)/(c) where the layer (a) and the layers (c) are adjacent to one another, or at least one layer forming unit (a)/(c)/(a) where the layers (a) and the layer (c) are adjacent to one another.

The stretched laminate film according to the present invention is a laminate including at least one layer forming unit where at least one layer (a) and at least one layer (c) are adjacent to each other as well as the layer (b) formed of the thermoplastic resin.

No specific restrictions are imposed on the type of the thermoplastic resin constituting the layer (b). Specific examples of the thermoplastic resin to be used for the layer (b) include polyolefin-based polymers such as low-density polyethylene, high-density polyethylene, linear low-density polyethylene, polypropylene, poly(4-methylpentene), cyclic polyolefins and the like; copolymers of such polyolefin-based polymers; acid-modified products of such polyolefin-based polymers and such copolymers; vinyl-acetate-containing copolymers such as polyvinyl acetate, ethylene-vinyl acetate copolymers, saponified ethylene-vinyl acetate copolymers polyvinyl alcohol and the like; aromatic polyester polymers such as polyethylene terephthalate, polybutylene terephthalate and polyethylene naphthalate; copolymers of such aromatic polyester-based polymers; aliphatic polyester-based polymers such as poly(E-caprolactone), polyhydroxybutyrate and polyhydroxyvalerate; copolymers of such aliphatic polyester-based polymers; polyamide polymers and copolymers thereof, such as nylon 6, nylon 66, nylon 12, nylon 6/66 copolymers, nylon 6/12 copolymers, metaxylene adipamide-nylon 6 copolymers and the like; polyether-based polymers such as polyethersulfone, polyphenylene sulfide, polyphenylene oxide and the like; chlorine-containing polymers and fluorine-containing polymers such as polyvinyl chloride, polyvinylidene chloride, polyvinyl fluoride and polyvinylidene fluoride; copolymers of such chlorine-containing polymers and such fluorine-containing polymers; acrylic-based polymers such as polymethyl acrylate, polyethyl acrylate, polymethyl methacrylate, polyethyl methacrylate, polyacrylonitrile and the like; copolymers of such acrylic-based polymers; styrene-based polymers such as polystyrene and the like; copolymers of such styrene-based polymers; polyimide polymers; and copolymers of such polyimide polymers.

A thermoplastic resin to be contained in the layer (b) formed of the thermoplastic resin can be selected on the basis of a required function depending on the necessity. For example, the thermoplastic resin can be used as a substrate for the layers (a) and (c), as a heavy duty layer and a sheet layer which constitute an outer layer, and as a reinforcement layer and a gas barrier support layer which constitute an intermediate layer. Out of the aforementioned examples, it is desirable that polyethylene terephthalate, polypropylene, polyamide polymers, polystyrene and the like be used for the viewpoint of the stretching formability. In the case of the stretched laminate film according to the present invention, at least the layers (a) and (b) are required to be stretched.

In the case of the stretched laminate film according to the present invention, at least one of the layers (a) and (c) is superposed on one surface or the two surfaces of the layer (b) formed of the thermoplastic resin with or without use of an adhesive. Layers may be superposed in order of the layer (b)/the layer (a)/the layer (c) . . . , or the layer (b)/the layer (c)/the layer (a) . . . . The laminate film needs to include the layer (b) and at least one layer forming unit including the layer (a) and the layer (c) which are adjacent to each other in the layer structure. In addition, the layer structure of the laminate film may include a plurality of layers (b). Furthermore, with regard to the laminate film obtained by superposing at least one of the layers (a) and (c) on surface of the layer (b), an adhesive or an anchoring agent can be used, for example, between the layers (b) and (a) or between the layers (b) and (c) depending on the necessity. For example, an adhesive similar to a resin which is used along with the multivalent metal compound (C) of the layer (c) can be used between the layers (b) and (a).

With regard to the laminate film according to the present invention which has the layer structure as described above, at least the layers (a) and (b) are stretched with a surface stretch ratio of 1.1 to 100. It is desirable that at least the layers (a) and (b) be stretched with a surface stretch ratio of 1.1 to 50. It is more desirable that at least the layers (a) and (b) be stretched with a surface stretch ratio of 1.1 to 25. A surface stretch ratio with which the layer (a) is stretched may be equal to, or different from, a surface stretch ratio with which the layer (b) is stretched. It does not matter whether the layers (a) and (b) may be stretched uniaxially or biaxially.

It is desirable that the thickness of the stretched laminate film according to the present invention be 1 to 200 µm. It is more desirable that the thickness be 5 to 100 µm. It is the most desirable that the thickness be 10 to 100 µm. In addition, it is desirable that the thickness of the layer (a) be 0.001 to 50 µm.

It is more desirable that the thickness of the layer (a) be 0.01 to 10 μm. It is desirable that the thickness of the layer (c) be 0.1 to 50 μm. It is more desirable that the thickness of the layer (c) be 0.1 to 10 μm. It is desirable that the thickness of the layer (b) be 0.3 to 190 μm. It is more desirable that the thickness of the layer (b) be 5 to 100 μm.

Next, descriptions will be provided for a method of producing the stretched laminate film according to the present invention. Descriptions which have been provided for the aforementioned stretched laminate film can be applied to the method of producing the stretched laminate film in terms of the materials for the polycarboxylate-based polymer (A), the plasticizer (B), the multivalent metal compound (C) and the like to be used in the present invention as well as physical properties which these materials need to have, and quantitative relationships among the materials.

The method of producing the stretched laminate film according to the present invention includes the steps of: superposing at least one of the layer (a) and the layer (c) on at least one surface of the layer (b); and stretching the laminate film including the layers (a) and (b). Through the steps, the stretched laminate film is provided. The stretched laminate film includes the layer (a) formed from the composition of the polycarboxylate-based polymer (A) and the plasticizer (B); the layer (c) containing the multivalent metal compound (C); and the layer (b) formed of the thermoplastic resin. In addition, the stretched laminate film includes at least one layer forming unit where the layers (a) and (c) are adjacent to each other.

The method of producing the stretched laminate film according to the present invention will be described giving an example where polyacrylic acid (PAA) is used as the polycarboxylate-based polymer (A). However, the present invention is not limited to the example shown by this example.

Polyacrylic acid (PAA) is diluted with distilled water, and thus, for example, a 5 percent-by-mass aqueous PAA solution is prepared. 10 mass parts of a 5 percent-by-mass aqueous glycerin solution serving as the plasticizer (B) added to, for example, 90 mass parts of the resultant aqueous PAA, followed by agitation. Hence, an aqueous mixture of PAA and glycerin is prepared. The aqueous mixture of PAA and glycerin thus obtained is applied to one surface or the two surfaces of an unstretched amorphous polyethylene terephthalate sheet (or PET sheet) with a thickness of 250 μm by means of a coating method (e.g. by use of a desk coater), followed by drying at a temperature ranging from room temperature to 90° C., for a time length ranging from 10 to 60 seconds (e.g. at 70° C. for 30 seconds), so that the thickness obtained by the drying is, for example, 1 μm. The laminate in which the composition formed from PAA and the plasticizer is superposed on the PET sheet is obtained.

The coating method as used herein means a coating process including methods of applying to the surface of the layer (c) formed of the thermoplastic resin, a dispersant or solution of the mixture of the polycarboxylate-based polymer (A) and the plasticizer (B) or a dispersant or solution of the mixture of the multivalent metal compound (C) and the resin, by use of a gravure roll coater, a reverse roll coater, a dip coater, a die coater, an air knife coater, a mayer rod coater, a brush or the like; methods of spraying the suspension or solution by use of a spray; and a dipping method.

In the case of the present invention, since the materials to be superposed are in the form of a solution or a dispersant, it is desirable that layers be superposed on one another by means of the coating process.

Meanwhile, a hardener (polyisocyanate) is added, desirably in an amount equivalent to 0 to 15 mass parts, or more desirably in an amount equivalent to 2 to 10 mass parts, to 100 mass parts of a fluid dispersion of a mixture of zinc oxide granules serving as a multivalent metal compound (C) and a polyester resin (nonvolatile components: 33%, solvent: toluene/MEK). Thus, a solution of a mixture containing the multivalent metal compound is prepared. This solution of the mixture containing zinc oxide is applied to the surface of the PET sheet, where the mixture of PAA and glycerin is applied and dried, by use of a desk coater, and thereafter is dried at a temperature ranging from room temperature to 90° C. for a time length of 10 to 60 seconds (e.g. at 70° C. for 30 seconds) so that the thickness is approximately 1 μm. In this respect, the mixture ratio of the zinc oxide to the resin in the dispersant of the mixture of the zinc oxide granules and the resin is 1/100 to 10/1. The chemical equivalent of the zinc (Zn) relative to carboxyl groups in the PAA is not smaller than 0.2.

In this manner, a laminate sheet is obtained by the coating process, which sheet is formed of a layer (b) made of the unstretched amorphous polyethylene terephthalate, a layer (a) made of the mixture of the PAA and the glycerin, and a layer (c) made of the zinc oxide granules and the polyester resin. Subsequently, the laminate sheet obtained by the coating process is stretched uniaxially or biaxially, desirably at a temperature in a range of 20 to 180° C., more desirably at a temperature in a range of 40 to 120° C. Thus, the stretched laminate film is obtained. It is desirable that the surface stretch ratio be in a range of 1.1 to 100. It is more desirable that the surface stretch ratio be in a range of 1.1 to 50. It is the most desirable that the surface stretch ratio be in a range of 1.1 to 25. Incidentally, the surface stretch ratio as herein used means a ratio obtained by multiplying a ratio with which a film is stretched in a vertical direction (a direction in which the film runs) by a ratio which the film is stretched in a horizontal direction (a direction perpendicular to the direction in which the film runs). The stretch is performed by use of a machine such as a tenter stretching machine and an inflation stretching machine. The productivity of the stretched laminate film per unit time is desirably improved if the film is stretched uniaxially, or biaxially simultaneously, at a temperature in a range of 20 to 180° C. (if the film is stretched with heat), more desirably at a temperature in a range of 40 to 120° C.

At this point, the layer (b) may be that which has already been stretched in one direction, or that which has not been stretched yet in the step of superposing (applying) at least one of the layer (a) and the layer (c) on one surface of the layer (b) formed of the thermoplastic resin. As an end-product, the stretched laminate film needs to be that which includes at least one layer forming unit where the layers (a) and (c) are adjacent to each other, and which is obtained by stretching at least the layers (a) and (b) desirably with a surface stretch ratio of 1.1 to 100 in the stretching step. In the case of the aforementioned example, the layer (b) formed of the thermoplastic resin is an unstretched amorphous polyethylene terephthalate layer. With regard to the coating sequence, it does not matter whether the layer (a) or the layer (c) is applied to the layer (b) first. In the case of the present invention, it is desirable that the layers (a) and (c) are superposed by means of the coating process, since the materials for the layers (a) and (c) are often in the form of a solution or a fluid dispersant.

In the case of the production method according to the present invention, it is desirable that the below-mentioned aspects be carried out.

A first aspect is a method of producing the stretched laminate film, in accordance with which the layer (c) is applied to a surface obtained by applying the layer (a) to the layer (b), or the layer (a) is applied to a surface obtained by applying the layer (c) to the layer (b). Thereafter, the laminate film is stretched. In the case of this method, whether the layer (b) may be a stretched film or an unstretched film, a laminate including one layer forming unit where the layers (a) and (c) are adjacent to each other is formed, thereafter the laminate is stretched, and the stretched laminate film is provided.

A second aspect is a method of producing the stretched laminate film, in accordance with which at least one of the layer (a) and the layer (c) is applied to at least one surface of the layer (b) formed of the unstretched thermoplastic resin which has been melted and extruded, and the laminate film obtained by the application is stretched in one direction. In accordance with the method, in a case where the layer (a) is applied thereto, the layer (c) which is adjacent to the layer (a), and which, along with the layer (a), constitutes the layer forming unit, is subsequently applied to the applied layer (a), and then is stretched in a direction perpendicular to the aforementioned direction in which the layer (a) has been stretched. In a case where the layer (c) is applied thereto, the layer (a) which is adjacent to the layer (c), and which, along with the layer (c), constitutes the layer forming unit, is subsequently applied to the applied layer (c), and then is stretched in a direction perpendicular to the aforementioned direction in which the layer (c) has been stretched. This method is a method in which application and stretch are performed alternately: the applying of one of the layers (a) and (c) to the unstretched layer (b) which has been melted and extruded; the stretching of the laminate film obtained by the application; the applying of the other of the layers (a) and (c) to the laminate film thus stretched; and the stretching of the laminate film obtained by the application. This method is an aspect of the present invention, in accordance with which the formation and the application of the films are carried out in an integrated manner.

A third aspect is a method of producing the stretched laminate film, in accordance with which at least the layer (a) is applied to at least one surface of the layer (b) formed of a thermoplastic resin which has been stretched in only one direction after being melted and extruded, and a laminate film obtained by the application is stretched in a direction perpendicular to the direction in which the layer (b) has been stretched. According to the method, in a case where the layer (a) is applied thereto, the layer (c) which is adjacent to the layer (a), and which, along with the layer (a), constitutes the layer forming unit, is applied to the applied layer (a). In a case where the layer (c) is applied thereto, the layer (a) which is adjacent to the layer (c), and which, along with the layer (c), constitutes the layer forming unit, is applied to the applied layer (c). A specific example of this method is as follows. The layer (c) and the layer (a) are sequentially applied, in this order, to the layer (b) which has been stretched only in one direction after being melted and extruded, and a laminate film obtained by applying the layers (c) and (a) to the layer (b) is stretched in a direction perpendicular to the direction in which the layer (b) has been stretched. Then, the layer (c) is applied to the surface of the layer (a) which has been applied sequentially. In this case, it does not matter that the layer (c) later applied is not stretched. This method is an aspect of the present invention, in accordance with which the formation and the application of the films are carried out in an integrated manner.

A fourth aspect is a method of producing the stretched laminate film, in accordance with which the layers (a) and (c) are sequentially applied to at least one surface of the layer (b) formed of an unstretched thermoplastic resin which has been melted and extruded, and thereafter a laminate film obtained by the application is stretched in a direction in which the film runs and in a direction perpendicular to the running direction at the same time. This method is an aspect of the present invention, in accordance with which the formation and the application of the films are carried out in an integrated manner.

A fifth aspect is a method of producing the stretched laminate film, in accordance with which the layer (a) is applied to at least one surface of the layer (b) formed of an unstretched thermoplastic resin which has been melted and extruded, thereafter a laminate film obtained by the application is stretched in a direction in which the film runs and in a direction perpendicular to the running direction at the same time, and subsequently the layer (c) is applied to the surface of the applied layer (a). This method is an aspect of the present invention, in accordance with which the formation and the application of the films are carried out in an integrated manner.

As described above, the methods of producing the stretched laminate film according to the present invention include the production methods in accordance with which the film forming step, the applying step and the stretching step are carried out independently; and the production methods, in accordance with which the application of the layers (a) and (c) to the layer (b) which has been melted and extruded as well as the stretching of the laminate film obtained by the application are carried out in an integrated manner.

Each of the aforementioned production methods may be applied to any one of an in-line coating system and an off-line coating system as follows. In the case of the in-line coating system, the film is produced by means of carrying out the film forming step, the applying step and the stretching step continuously. In the case of off-line coating system, an intermediate product is put out of the production line in a particular step out of the aforementioned steps, and is returned to the production line in a step following the particular step at an arbitrary time.

The following points can be cited as advantages brought about by the aforementioned in-line coating system (the formation of the film and the application are carried out in an integrated manner).

1. In a case where the thermoplastic resin film to be applied is made of a material (e.g. nylon) susceptible to influence of humidity, if the formation and the application of the film are performed in the production line at one time, this precludes the following problem which would otherwise occur since the films are put out of the production line for no time. However, if the film is put out of the production line between the formation and the application of the film for a certain time length, this makes it likely that the film absorbs moisture during the time length, and that the appearance is accordingly deteriorated due to the moisture after the application.

2. In general, the thermoplastic resin film to be applied is formed with a width of 4 to 6 m. Thereafter, the film is slit into strips each with a width of 1 to 2 m, and is supplied for the application. Physical properties, including shrinkage in the width direction, differ among the strips of the film. Depending on which parts of the film are used, shrinkage becomes different among the strips of the film in the drying step while the application is being performed. This hinders the strips of the film from running stably. In the case of the in-line coating system, if the application comes before the stretch, this makes it possible to avoid the aforementioned problem which would otherwise occur.

3. In the case of the in-line coating system where the application comes before the stretch, the thickness resulting from the application can be one or more orders of magnitude small, and resultantly the barrier performance can be exhibited quickly, in comparison with the thickness in the case of the off-line coating system. This is because ions supplied from the layer (c) formed from the multivalent metal compound develop the oxygen-gas barrier properties.

4. Productivity can be enhanced, and costs can be reduced, since the films are formed and applied in an integrated manner in the production line.

It is desirable that the oxygen permeability of the stretched laminate film thus obtained be not larger than 1000 cm$^3$ (STP)/m$^2$·day·MPa at 30° C. at a relative humidity of 80%. It is more desirable that the oxygen permeability be not larger than 500 cm$^3$ (STP)/m$^2$·day·MPa under the same conditions. It is the most desirable that the oxygen permeability be not larger than 100 cm$^3$ (STP)/m$^2$·day·MPa under the same conditions.

The stretched laminate film according to the present invention can be used while being adhered to an arbitrary plastic film. In this case, the adhesion can be performed by use of a publicly-known lamination method such as the dry lamination method, the wet lamination method and the extrusion lamination method. If the configuration of the materials for the stretched laminate film is arbitrarily selected, the stretched laminate film can be used while provided with easiness-to-open, easiness-to-tear, contraction and expansion properties, microwavability, UV-blocking properties, good appearance and the like. The stretched laminate film according to the present invention is suitable as packaging materials and packaging containers for foods, beverages, chemicals, pharmaceuticals and precision metal parts such as electronic parts, all of which are susceptible to deterioration stemming from influence of oxygen and the like. In addition, the stretched laminate film according to the present invention can be suitably used as packaging materials for articles which require stable oxygen-gas barrier properties for a long time, and which need to be treated under conditions of high-temperature hot water, including boil and retort sterilization. Specific examples of the articles which require a treatment, such as boil and retort sterilization, under conditions of high-temperature hot water include seasoned foods such as curry, stew and pasta source; seasoning mixes such as premixes for Chinese food; baby foods; cooked rice; rice gruel; cooked foods for toaster ovens and microwave ovens; soups; desserts; agricultural products; and livestock products. Examples of the agricultural products include foods to be heat-cooked while retorted or boiled for sterilization, such as grains (e.g., potatoes, sweet potatoes, corn, chestnuts and beans), vegetables (asparagus, broccolis, cabbages, bamboo shoots and tomatoes), root vegetables (e.g., radishes, carrots, yams, burdocks and lotus roots), mushrooms and fruits (e.g., apples and pineapples). Examples of the livestock products include sausages and hams.

In addition, in the case of the stretched laminate film, the applied layers themselves are stretched. This makes it possible to make even the thickness resulting from the application, to make the films thinner, and to carry out stable operations from viewpoints of performance and production costs.

EXAMPLES

Specific descriptions will be provided below for the present invention by giving examples. However, the present invention is not limited to these examples.

Method of Evaluating Oxygen Permeability

Oxygen permeability was measured by use of the following method with samples taken into consideration.

Oxygen permeability of a film was measured by use of OX-TRAN™ Model 2/20, which was an oxygen permeation instrument made by MOCON Inc. The measuring method was governed by B method (an equal-pressure method) of JIS K-7126 and ASTM D3985-81. (1) With regard to the stretched laminate film, oxygen permeability was measured at a temperature of 30° C. at a relative humidity of 80% (expressed as 80% (RH) in some cases), and a measured value was denominated by a unit of cm$^3$ (STP)/(m$^2$·day·MPa). (2) With regard to the polyacrylic acid, oxygen permeability was measured at a temperature of 30° C. at a relative humidity of 0%. A measured value was converted to a coefficient on the oxygen permeability by means of multiplying the measured value by the thickness of the polycarboxylic acid, and the coefficient on the oxygen permeability was denominated by a unit of cm$^3$ (STP) μm/(m$^2$·day·MPa). In this respect, (STP) means the standard conditions (0° C. and 1 atm) for specifying the volume of oxygen.

Evaluation of Cracks in Coated Layers

A 50 cm×50 cm square piece was cut out from a laminate film, and 5 areas arbitrarily chosen from the cut-out piece of the laminate film was used as a sample to be observed. The sample film was cut in the direction perpendicular to the plane of the sample film, the cut area thus obtained was observed by use of a scanning electron microscope. The cut area was observed, for example, by use of Hitachi Scanning Electron Microscope S800 with an acceleration voltage of 3.0 to 20 keV with an observation magnification ranging from 5000 to 50000. By means of observing the coated layer, it was checked whether or not breaking (cracks) were present in the coated layer. In a case where cracks were not noticed in not less than 4 observed samples, the film was regarded as having "no cracks."

Production Example 1

A coating solution 1 (a coating liquid containing an adhesive) was prepared in the following manner.

A polyester adhesive (Producer: Mitsui Takeda Chemicals, Inc., Product Name: TAKELAC A525) and an isocyanate hardener (Producer: Mitsui Takeda Chemicals, Inc., Product Name: Takenate A52) which were commercially available were mixed with each other with a mass ratio of 9:1, and were diluted with ethyl acetate in order that the solid components could be 5 percent by mass. Thus, a coating liquid was prepared.

Production Example 2

A coating solution 2 (a coating liquid containing polyacrylic acid and a plasticizer) was prepared in the following manner. 0.28 mass parts of sodium hydroxide (producer: Wako Pure Chemical Industries, Ltd.) was added to 100 mass parts of commercially available polyacrylic acid (producer: Toagosei Co., Ltd., product name: Aron™ A-10H, an aqueous solution with a number average molecular weight of 200,000 and 25-percent-by-mass solid components), and thus a partially-neutralized aqueous solution with a neutralization degree of 2 mol % was prepared. This aqueous solution was diluted with a solution obtained by mixing water and isopropyl alcohol with a mass ratio of 9:1 in order that the solid components could be 3 percent by mass. A 3 percent-by-mass aqueous glycerin solution was added to the aqueous solution thus diluted in such an amount that a ratio of the mass parts of the 3 percent-by-mass aqueous glycerin solution to the mass parts of the 3 percent-by-mass aqueous polyacrylic acid solution could be 10:90. Thus, a coating liquid was prepared. Incidentally, a coefficient on the oxygen permeability of the used polyacrylic acid was 50 cm$^3$ (STP) μm/ (m$^2$·day·MPa) at 30° C. at a relative humidity of 0%.

Production Example 3

A coating solution 3 (a coating liquid containing a multivalent metal compound) was prepared in the following manner. 100 mass parts of a commercially available coating material containing ultrafine granules of zinc oxide (producer: Sumitomo Osaka Cement Co. Ltd., product name: ZR133) and 5 mass parts of a commercially available isocyanate hardener (producer: Sumitomo Osaka Cement Co. Ltd.) were mixed with each other, and were diluted with a solvent obtained by mixing toluene and methyl ethyl ketone with a mass ratio of 4:1 in order that the solid components could be 20 percent by mass. Thus, a coating liquid was prepared.

Examples, comparative examples and reference examples will be described below, and results of evaluating those examples will be shown in Tables 1-1 and 1-2. Reference symbol d in the Tables denotes the coating liquid containing the adhesive according to Production Example 1; a, the coating liquid containing the polyacrylic acid and the glycerin according to Production Example 2; and c, the coating liquid containing the ultrafine granules of zinc oxide according to Production Example 3. Their oxygen permeabilities were measured at 30° C. and at a relative humidity of 80%, and denominated by a unit of cm$^3$ (STP)/(m$^2$·day·MPa).

Example 1

A PET resin (producer: Toyobo., Ltd., product name: Unipet RT-580) was melted and extruded by use of the T-die method at 270 to 300° C., and the resultant PET resin was cooled by use of a cooling roller with a temperature of 15° C. Thus, an unstretched film with a thickness of 120 μm was formed. By means of passing this unstretched film between a pair of rollers each with a temperature of 87° C. whose circumferential speeds were different from each other, the film was stretched three times the original size of the film in the vertical direction (a direction in which the film ran). Subsequently, the coating solutions 1 and 2 respectively obtained in Production Examples 1 and 2 were applied, in the order from the solution 1 to the solution 2, to the surface of the resultant uniaxially stretched film by use of the offset gravure method, followed by drying. Thereafter, the resultant film was stretched three times the original size of the film in the horizontal direction (a direction perpendicular to the direction in which the film ran) by use of a tenter (a product of Ichikin Company) in a furnace with a temperature of 120° C. Then, the coating solution obtained in Production Example 3 was applied to the surface of the resultant biaxially stretched film by use of the offset gravure method, followed by drying. Thus, a biaxially stretched laminate film with a thickness of approximately 14 μm which had been stretched with a surface stretch ratio of 9 was obtained. (Thicknesses of the layers PET, (d), (a) and (c) were 13 μm, 0.1 μm, 0.3 μm and 1 μm respectively.)

Example 2

PET resin similar to that used in Example 1 was extruded as in the case of Example 1, and thus an unstretched film with a thickness of 120 μm was formed. Then, the resultant film was stretched three times the original size of the film in the vertical direction under the same conditions as were used in Example 1. Subsequently, the coating solutions 1 to 3 respectively obtained in Production Examples 1 to 3 were applied, in the order from the solution 1, the solution 2 to the solution 3, to the surface of the resultant uniaxially stretched film by use of the offset gravure method, followed by drying. Thereafter, the resultant film was stretched three times the original size of the film in the horizontal direction (a direction perpendicular to the direction in which the film ran) by use of the tenter (a product of Ichikin Company) in the furnace with the temperature of 120° C. Thus, a biaxially stretched laminate film with a thickness of approximately 14 μm which had been stretched with the surface stretch ratio of 9 was obtained. (Thicknesses of the layers PET, (d), (a) and (c) were 13 μm, 0.1 μm, 0.3 μm and 1 μm respectively.)

Example 3

PET resin similar to that used in Example 1 was extruded as in the case of Example 1, and thus an unstretched film with a thickness of 120 μm was formed. Then, the coating solution obtained in Production Example 1 was applied to the resultant unstretched film by use of the offset gravure method, followed by drying. Thereafter, by means of passing the resultant film between the pair of rollers with the temperature of 87° C. whose circumferential speeds were different from each other, the film was stretched three times the original size of the film in the vertical direction (the direction in which the film ran). Subsequently, the coating solution obtained in Production Example 2 was applied to the surface of the resultant uniaxially stretched film by use of the offset gravure method, followed by drying. Thereafter, the resultant film was stretched three times the original size of the film in the horizontal direction (the direction perpendicular to the direction in which the film ran) by use of the tenter (a product of Ichikin Company) in the furnace with the temperature of 120° C. Then, the coating solution obtained in Production Example 3 was applied to the surface of the resultant biaxially stretched film by use of the offset gravure method, followed by drying. Thus, a biaxially stretched laminate film with a thickness of approximately 14 μm which had been stretched with a surface stretch ratio of 9 was obtained. (Thicknesses of the layers PET, (d), (a) and (c) were 13 μm, 0.1 μm, 0.3 μm and 1 μm respectively.)

Example 4

PET resin similar to that used in Example 1 was extruded as in the case of Example 1, and thus an unstretched film with a thickness of 120 μm was formed. Then, the coating solution obtained in Production Example 1 was applied to the resultant unstretched film by use of the offset gravure method, followed by drying. Thereafter, by means of passing the resultant film between the pair of rollers with the temperature of 87° C. whose circumferential speeds were different from each other, the film was stretched three times the original size of the film in the vertical direction (the direction in which the film ran). Subsequently, the coating solutions 2 and 3 respectively obtained in Production Examples 2 and 3 were applied, in the order from the solution 2 to the solution 3, to the surface of the resultant uniaxially stretched film by use of the offset gravure method, followed by drying. Thereafter, the resultant film was stretched three times the original size of the film in the horizontal direction (the direction perpendicular to the direction in which the film ran) by use of the tenter (a product of Ichikin Company) in the furnace with the temperature of 120° C. Thus, a biaxially stretched laminate film with a thickness of approximately 14 μm which had been stretched with a surface stretch ratio of 9 was obtained. (Thicknesses of the layers PET, (d), (a) and (c) were 13 μm, 0.1 μm, 0.3 μm and 1 μm respectively.)

Example 5

PET resin similar to that used in Example 1 was extruded as in the case of Example 1, and thus an unstretched film with a thickness of 120 μm was formed. Then, the coating solutions 1 and 2 respectively obtained in Production Examples 1 and 2 were applied, in the order from the solution 1 to the solution 2, to the resultant unstretched film by use of the offset gravure method, followed by drying. Thereafter, by means of passing the resultant film between the pair of rollers with the temperature of 87° C. whose circumferential speeds were different from each other, the film was stretched three times the original size of the film in the vertical direction (the direction in which the film ran). Subsequently, the coating solution 3 obtained in Production Example 3 was applied to the surface of the resultant uniaxially stretched film by use of the offset gravure method, followed by drying. Thereafter, the resultant film was stretched three times the original size of the film in the horizontal direction (the direction perpendicular to the direction in which the film ran) by use of the tenter (a product of Ichikin Company) in the furnace with the temperature of 120° C. Thus, a biaxially stretched laminate film with a thickness of approximately 14 μm which had been stretched with a surface stretch ratio of 9 was obtained. (Thicknesses of the layers PET, (d), (a) and (c) were 13 μm, 0.1 μm, 0.1 μm and 1 μm respectively.)

Example 6

PET resin similar to that used in Example 1 was extruded as in the case of Example 1, and thus an unstretched film with a thickness of 120 μm was formed. Then, the coating solutions 1 and 2 respectively obtained in Production Examples 1 and 2 were applied, in the order from the solution 1 to the solution 2, to the resultant unstretched film by use of the offset gravure method, followed by drying. Thereafter, the resultant film was stretched biaxially simultaneously, that is, three times the original size of the film in the vertical direction and three times the original size of the film in the horizontal direction (the direction in which the film ran and the direction perpendicular to the direction in which the film ran) simultaneously, by use of the tenter (a product of Toshiba Machine Co., Ltd.) in the furnace with the temperature of 120° C. Subsequently, the coating solution obtained in Production Example 3 was applied to the surface of the resultant biaxially stretched film by use of the offset gravure method, followed by drying. Thus, a biaxially stretched laminate film with a thickness of approximately 14 μm which had been stretched with a surface stretch ratio of 9 was obtained. (Thicknesses of the layers PET, (d), (a) and (c) were 13 μm, 0.1 μm, 0.1 μm and 1 μm respectively.)

Example 7

PET resin similar to that used in Example 1 was extruded as in the case of Example 1, and thus an unstretched film with a thickness of 120 μm was formed. Then, the coating solutions 1 to 3 respectively obtained in Production Examples 1 to 3 were applied, in the order from the solution 1, the solution 2 to the solution 3, to the resultant unstretched film by use of the offset gravure method, followed by drying. Thereafter, the resultant film was stretched biaxially simultaneously, that is, three times the original size of the film in the vertical direction and three times the original size of the film in the horizontal direction (the direction in which the film ran and the direction perpendicular to the direction in which the film ran) simultaneously, by use of the tenter (a product of Toshiba Machine Co., Ltd.) in the furnace with the temperature of 120° C. Thus, a biaxially stretched laminate film with a thickness of approximately 14 μm which had been stretched with a surface stretch ratio of 9 was obtained. (Thicknesses of the layers PET, (d), (a) and (c) were 13 μm, 0.1 μm, 0.1 μm and 0.5 μm respectively.)

Example 8

PET resin similar to that used in Example 1 was extruded as in the case of Example 1, and thus an unstretched film with a thickness of 120 μm was formed. Then, the coating solutions 1 to 3 respectively obtained in Production Examples 1 to 3 were applied, in the order from the solution 1, the solution 2 to the solution 3, to the resultant unstretched film by use of the offset gravure method, followed by drying. Thereafter, the resultant film was wound into a roll. Subsequently, this applied roll was brought into a tenter (product of Toshiba Machine Co., Ltd.). In the furnace with the temperature of 120° C., the film was stretched biaxially simultaneously, that is, three times the original size of the film in the vertical direction and three times the original size of the film in the horizontal direction (the direction in which the film ran and the direction perpendicular to the direction in which the film ran) simultaneously. Thus, a biaxially stretched laminate film with a thickness of approximately 14 μm which had been stretched with a surface stretch ratio of 9 was obtained. (Thicknesses of the layers PET, (d), (a) and (c) were 13 μm, 0.1 μm, 0.1 μm and 0.5 μm respectively.)

Example 9

By use of the same method as was used in Example 7, a biaxially stretched laminate film with a thickness of approximately 16 μm which had been stretched with the surface stretch ratio of 9 was obtained, except that an unstretched film with the thickness of 140 μm obtained in the following procedure was used. The unstretched film was obtained by means of melting and extruding nylon resin (producer: Unitika Ltd., product name: A1030BRT), in stead of the PET resin film used in Example 7, by use of the T-die method at a temperature ranging from 220 to 240° C., and subsequently by means of cooling the resultant nylon resin by use of a cooling roller with a temperature of 15° C. (Thicknesses of the layers Ny, (d), (a) and (c) were 15 μm, 0.1 μm, 0.3 μm and 0.5 μm respectively.)

Example 10

By use of the same method as was used in Example 7, a biaxially stretched laminate film with a thickness of approximately 21 μm which had been stretched with the surface stretch ratio of 9 was obtained, except that an unstretched film with the thickness of 180 μm obtained in the following procedure was used. The unstretched film was obtained by means of melting and extruding polypropylene resin (producer: Sumitomo Chemical Co., Ltd., product name: Noblen FK145) (abbreviated to "OPP" in some cases), in stead of the PET resin film used in Example 7, by use of the T-die method at a temperature ranging from 140 to 160° C., and subsequently by means of cooling the resultant polypropylene resin by use of a cooling roller with a temperature of 15° C. (Thicknesses of the layers OPP, (d), (a) and (c) were 20 μm, 0.1 μm, 0.1 μm and 0.5 μm respectively.)

The biaxially stretched laminate films respectively obtained by carrying out the methods of Examples 1 to 10 were regarded as having no cracks in their coated layers. The oxygen-gas permeabilities of the respective biaxially stretched laminate films were in a range of 2.0 to 30 cm³ (STP)/(m²·day·MPa) (at 30° C. at a relative humidity of 80%). The biaxially stretched laminate films exhibited better oxygen-gas barrier properties than films obtained by carrying out methods respectively used in the following reference examples 1, 2, 3 and 8. In addition, in the cases of Examples 1 to 7 as well as 9 and 10, the stretch with heat was performed after the application in the integrated manner by use of the in-line coating method. Thereby, the methods of Examples 1 to 7 as well as 9 and 10 showed extremely high productivities per unit time.

Example 11

PET resin similar to that used in Example 1 was extruded as in the case of Example 1, and thus an unstretched film with a thickness of 120 μm was formed. By means of passing the resultant unstretched film between the pair of rollers with the temperature of 87° C. whose circumferential speeds were different from each other, the film was stretched three times the original size of the film in the vertical direction (the direction in which the film ran). The coating solutions 2 and 3 respectively obtained in Production Examples 2 and 3 were applied, in the order from the solution 2 to the solution 3, to the surface of the resultant uniaxially stretched film by use of the offset gravure method, followed by drying. By use of the tenter (a product of Ichikin Company), thereafter, the resultant uniaxially stretched film was stretched three times the original size of the film in the horizontal direction (the direction perpendicular to the direction in which the film ran) in the furnace with the temperature of 120° C. Thus, a biaxially stretched laminate film with a thickness of approximately 14 μm which had been stretched with the surface stretch ratio of 9 was obtained. (Thicknesses respectively of the layers PET, (a) and (c) were 13 μm, 0.3 μm and 1 μm respectively.)

Example 12

PET resin similar to that used in Example 1 was extruded as in the case of Example 1, and thus an unstretched film with a thickness of 120 μm was formed. Then, the coating solution obtained in Production Example 2 was applied to the resultant unstretched film by use of the offset gravure method, followed by drying. Thereafter, by means of passing the resultant film between the pair of rollers with the temperature of 87° C. whose circumferential speeds were different from each other, the film was stretched three times the original size of the film in the vertical direction (the direction in which the film ran). Subsequently, the coating solution 3 obtained in Production Example 3 was applied to the surface of the resultant uniaxially stretched film by use of the offset gravure method, followed by drying. By use of the tenter (a product of Ichikin Company), thereafter, the resultant film was stretched three times the original size of the film in the horizontal direction (the direction perpendicular to the direction in which the film ran) in the furnace with the temperature of 120° C. Thus, a biaxially 14 μm which had been stretched with a surface approximately 14 μm which had been stretched with a surface stretch ratio of 9 was obtained. (Thicknesses of the layers PET, (a) and (c) were 13 μm, 0.1 μm and 1 μm respectively.)

Example 13

PET resin similar to that used in Example 1 was extruded as in the case of Example 1, and thus an unstretched film with a thickness of 120 μm was formed. Then, the coating solutions 2 and 3 respectively obtained in Production Examples 2 and 3 were applied, in the order from the solution 2 to the solution 3, to the resultant unstretched film by use of the offset gravure method, followed by drying. By use of the tenter (a product of Toshiba Machine Co., Ltd.), thereafter, the resultant film was stretched biaxially simultaneously, that is, three times the original size of the film in the vertical direction and three times the original size of the film in the horizontal direction (the direction in which the film ran and the direction perpendicular to the direction in which the film ran) simultaneously, in the furnace with the temperature of 120° C. Thus, a biaxially stretched laminate film with a thickness of approximately 14 μm which had been stretched with a surface stretch ratio of 9 was obtained. (Thicknesses of the layers PET, (a) and (c) were 13 μm, 0.1 μm and 0.5 μm respectively.)

Example 14

PET resin similar to that used in Example 1 was extruded as in the case of Example 1, and thus an unstretched film with a thickness of 120 μm was formed. Then, the coating solutions 2 and 3 respectively obtained in Production Examples 2 and 3 were applied, in the order from the solution 2 to the solution 3, to the resultant unstretched film by use of the offset gravure method, followed by drying. Thereafter, the resultant film was wound into a roll. Subsequently, the applied roll was brought into the tenter (a product of Toshiba Machine Co., Ltd.). The resultant film was stretched biaxially simultaneously, that is, three times the original size of the film in the vertical direction and three times the original size of the film in the horizontal direction (the direction in which the film ran and the direction perpendicular to the direction in which the film ran) simultaneously, in the furnace with the temperature of 120° C. Thus, a biaxially stretched laminate film with a thickness of approximately 14 μm which had been stretched with a surface stretch ratio of 9 was obtained. (Thicknesses of the layers PET, (a) and (c) were 13 μm, 0.1 μm and 0.5 μm respectively.)

The biaxially stretched laminate films respectively obtained by carrying out the methods of Examples 11 to 14 were regarded as having no cracks in their coated layers. The oxygen-gas permeabilities of the respective biaxially stretched laminate films were 2.0 cm³ (STP)/(m²·day·MPa) (at 30° C. at a relative humidity of 80%). The biaxially stretched laminate films exhibited better oxygen-gas barrier properties than films obtained by carrying out methods respectively used in the following reference examples 4 and 9. In addition, in the cases of Examples 11 to 13, the stretch with heat was performed after the application by use of the in-line coating method. Thereby, the methods of Examples 11 to 13 showed extremely high productivities per unit time.

Example 15

A biaxially stretched laminate film with a thickness of approximately 15 μm which had a layer structure of the PET resin layer/multivalent metal layer/(PAA+plasticizer) layer/multivalent metal layer, and which had been stretched with the surface stretch ratio of 9, was obtained as in the case of Example 1, except that the coating solution (the coating liquid containing the adhesive) of Production Example 1 was replaced with the coating solution (the coating liquid containing the multivalent metal compound) of Production Example 3. (Thicknesses of the layers PET, (c), (a) and (c) were 13 µm, 1 µm, 0.3 µm and 1 µm respectively.)

Example 16

A biaxially stretched laminate film with a thickness of approximately 15 µm which had a layer structure of the PET resin layer/multivalent metal layer/(PAA+plasticizer) layer/multivalent metal layer, and which had been stretched with the surface stretch ratio of 9, was obtained as in the case of Example 2, except that the coating solution (the coating liquid containing the adhesive) of Production Example 1 was replaced with the coating solution (the coating liquid containing the multivalent metal compound) of Production Example 3. (Thicknesses of the layers PET, (c), (a) and (c) were 13 µm, 1 µm, 0.3 µm and 1 µm respectively.)

Example 17

A biaxially stretched laminate film with a thickness of approximately 15 µm which had a layer structure of the PET resin layer/multivalent metal layer/(PAA+plasticizer) layer/multivalent metal layer, and which had been stretched with the surface stretch ratio of 9, was obtained as in the case of Example 3, except that the coating solution (the coating liquid containing the adhesive) of Production Example 1 was replaced with the coating solution (the coating liquid containing the multivalent metal compound) of Production Example 3. (Thicknesses of the layers PET, (c), (a) and (c) were 13 µm, 0.5 µm, 0.3 µm and 1 µm respectively.)

Example 18

A biaxially stretched laminate film with a thickness of approximately 15 µm which had a layer structure of the PET resin layer/multivalent metal layer/(PAA+plasticizer) layer/multivalent metal layer, and which had been stretched with the surface stretch ratio of 9, was obtained as in the case of Example 4, except that the coating solution (the coating liquid containing the adhesive) of Production Example 1 was replaced with the coating solution (the coating liquid containing the multivalent metal compound) of Production Example 3. (Thicknesses of the layers PET, (c), (a) and (c) were 13 µm, 0.5 µm, 0.3 µm and 1 µm respectively.)

Example 19

A biaxially stretched laminate film with a thickness of approximately 15 µm which had a layer structure of the PET resin layer/multivalent metal layer/(PAA+plasticizer) layer/multivalent metal layer, and which had been stretched with the surface stretch ratio of 9, was obtained as in the case of Example 5, except that the coating solution (the coating liquid containing the adhesive) of Production Example 1 was replaced with the coating solution (the coating liquid containing the multivalent metal compound) of Production Example 3. (Thicknesses of the layers PET, (c), (a) and (c) were 13 µm, 0.5 µm, 0.1 µm and 1 µm respectively.)

Example 20

A biaxially stretched laminate film with a thickness of approximately 15 µm which had a layer structure of the PET resin layer/multivalent metal layer/(PAA+plasticizer) layer/multivalent metal layer, and which had been stretched with the surface stretch ratio of 9, was obtained as in the case of Example 6, except that the coating solution (the coating liquid containing the adhesive) of Production Example 1 was replaced with the coating solution (the coating liquid containing the multivalent metal compound) of Production Example 3. (Thicknesses of the layers PET, (c), (a) and (c) were 13 µm, 0.5 µm, 0.1 µm and 1 µm respectively.)

Example 21

A biaxially stretched laminate film with a thickness of approximately 14 µm which had a layer structure of the PET resin layer/multivalent metal layer/(PAA+plasticizer) layer/multivalent metal layer, and which had been stretched with the surface stretch ratio of 9, was obtained as in the case of Example 7, except that the coating solution (the coating liquid containing the adhesive) of Production Example 1 was replaced with the coating solution (the coating liquid containing the multivalent metal compound) of Production Example 3. (Thicknesses of the layers PET, (c), (a) and (c) were 13 µm, 0.5 µm, 0.1 µm and 0.5 µm respectively.)

Example 22

A biaxially stretched laminate film with a thickness of approximately 14 µm which had a layer structure of the PET resin layer/multivalent metal layer/(PAA+plasticizer) layer/multivalent metal layer, and which had been stretched with the surface stretch ratio of 9, was obtained as in the case of Example 8, except that the coating solution (the coating liquid containing the adhesive) of Production Example 1 was replaced with the coating solution (the coating liquid containing the multivalent metal compound) of Production Example 3. (Thicknesses of the layers PET, (c), (a) and (c) were 13 µm, 0.5 µm, 0.1 µm and 0.5 µm respectively.)

The biaxially stretched laminate films respectively obtained by carrying out the methods of Examples 15 to 22 were regarded as having no cracks in their coated layers. The oxygen-gas permeabilities of the respective biaxially stretched laminate films were 2.0 cm$^3$ (STP)/(m$^2$·day·MPa) (at 30° C. at a relative humidity of 80%). The biaxially stretched laminate films exhibited better oxygen-gas barrier properties than films obtained by carrying out methods respectively used in the following reference examples 5, 6, 7 and 10. In addition, in the cases of Examples 15 to 21, the stretch with heat was performed after the application by use of the in-line coating method. Thereby, the methods of Examples 15 to 21 showed extremely high productivities per unit time.

Reference Example 1

PET resin similar to that used in Example 1 was extruded as in the case of Example 1, and thus an unstretched film with a thickness of 120 µm was formed. Thereafter, by means of passing the unstretched film between the pair of rollers with the temperature of 87° C. whose circumferential speeds were different from each other, the film was stretched three times the original size of the film in the vertical direction (the direction in which the film ran). Then, the coating solution (the coating liquid containing the adhesive) obtained in Production Example 1 was applied to the surface of the resultant uniaxially stretched film by use of the offset gravure method, followed by drying. Subsequently, the resultant film was stretched three times the original size of the film in the horizontal direction (the direction perpendicular to the direction in which the film ran) by use of the tenter (a product of Ichikin Company) in the furnace with the temperature of 120° C.

Thereafter, the coating solutions 2 and 3 respectively obtained in Production Examples 2 and 3 were applied, in the order from the solution 2 to the solution 3, to the surface of the resultant biaxially stretched film by use of the offset gravure method, followed by drying. Thus, a biaxially stretched coated PET film with a thickness of approximately 14 μm was obtained. (Thicknesses of the layers PET, (d), (a) and (c) were 13 μm, 0.1 μm, 0.3 μm and 1 μm respectively.)

Reference Example 2

PET resin similar to that used in Example 1 was extruded as in the case of Example 1, and thus an unstretched film with a thickness of 120 μm was formed. Then, the coating solution obtained in Production Example 1 was applied to the unstretched film by use of the offset gravure method, followed by drying. By use of the tenter made by Toshiba Machine Co., Ltd., thereafter, the resultant film was stretched biaxially simultaneously, that is, three times the original size of the film in the vertical direction and three times the original size of the film in the horizontal direction (the direction in which the film ran and the direction perpendicular to the direction in which the film ran) simultaneously, in the furnace with the temperature of 120° C. Subsequently, the coating solutions 2 and 3 respectively obtained in Production Examples 2 and 3 were applied, in the order from the solution 2 to the solution 3, to the surface of the resultant biaxially stretched film by use of the offset gravure method, followed by drying. Thus, a biaxially stretched coated PET film with a thickness of approximately 14 μm was obtained. (Thicknesses of the layers PET, (d), (a) and (c) were 13 μm, 0.1 μm, 0.3 μm and 1 μm respectively.)

Reference Example 3

PET resin similar to that used in Example 1 was extruded as in the case of Example 1, and thus an unstretched film with a thickness of 120 μm was formed. By use of the tenter made by Toshiba Machine Co., Ltd., thereafter, this unstretched film was stretched biaxially simultaneously, that is, three times the original size of the film in the vertical direction and three times the original size of the film in the horizontal direction (the direction in which the film ran and the direction perpendicular to the direction in which the film ran) simultaneously, in the furnace with the temperature of 120° C. Subsequently, the coating solutions 1 to 3 respectively obtained in Production Examples 1 to 3 were applied, in the order from the solution 1, the solution 2 to the solution 3, to the surface of the resultant biaxially stretched film by use of the offset gravure method, followed by drying. Thus, a biaxially stretched coated PET film with a thickness of approximately 14 μm was obtained. (Thicknesses of the layers PET, (d), (a) and (c) were 13 μm, 0.1 μm, 0.3 μm and 1 μm respectively.)

Reference Example 4

PET resin similar to that used in Example 1 was extruded as in the case of Example 1, and thus an unstretched film with a thickness of 120 μm was formed. By use of the tenter, thereafter, this unstretched film was stretched biaxially simultaneously, that is, three times the original size of the film in the vertical direction and three times the original size of the film in the horizontal direction (the direction in which the film ran and the direction perpendicular to the direction in which the film ran) simultaneously, in the furnace with the temperature of 120° C. Subsequently, the coating solutions 2 and 3 respectively obtained in Production Examples 2 and 3 were applied, in the order from the solution 2 to the solution 3, to the surface of the resultant biaxially stretched film by use of the offset gravure method, followed by drying. Thus, a biaxially stretched coated PET film with a thickness of approximately 14 μm was obtained. (Thicknesses of the layers PET, (a) and (c) were 13 μm, 0.3 μm and 1 μm respectively.)

Reference Example 5

PET resin similar to that used in Example 1 was extruded as in the case of Example 1, and thus an unstretched film with a thickness of 120 μm was formed. Thereafter, by means of passing the unstretched film between the pair of rollers with the temperature of 87° C. whose circumferential speeds were different from each other, the film was stretched three times the original size of the film in the vertical direction (the direction in which the film ran). Then, the coating solution obtained in Production Example 3 was applied to the surface of the resultant uniaxially stretched film by use of the offset gravure method, followed by drying. Subsequently, the resultant film was stretched three times the original size of the film in the horizontal direction (the direction perpendicular to the direction in which the film ran) by use of the tenter made by Ichikin Company in the furnace with the temperature of 120° C. Thereafter, the coating solutions 2 and 3 respectively obtained in Production Examples 2 and 3 were applied, in the order from the solution 2 to the solution 3, to the resultant biaxially stretched film by use of the offset gravure method, followed by drying. Thus, a biaxially stretched coated PET film with a thickness of approximately 15 μm was obtained. (Thicknesses of the layers PET, (c), (a) and (c) were 13 μm, 1 μm, 0.3 μm and 1 μm respectively.)

Reference Example 6

PET resin similar to that used in Example 1 was extruded as in the case of Example 1, and thus an unstretched film with a thickness of 120 μm was formed. By use of the tenter made by Toshiba Machine Co., Ltd., thereafter, this unstretched film was stretched biaxially simultaneously, that is, three times the original size of the film in the vertical direction and three times the original size of the film in the horizontal direction (the direction in which the film ran and the direction perpendicular to the direction in which the film ran) simultaneously, in the furnace with the temperature of 120° C. Subsequently, the coating solutions 2 and 3 respectively obtained in Production Examples 2 and 3 were applied, in the order from the solution 2, the solution 3 to the solution 2, to the surface of the resultant biaxially stretched film by use of the offset gravure method, followed by drying. Thus, a biaxially stretched coated PET film with a thickness of approximately 15 μm was obtained. (Thicknesses of the layers PET, (a), (c) and (a) were 13 μm, 0.3 μm, 1 μm and 0.3 μm respectively.)

Reference Example 7

PET resin similar to that used in Example 1 was extruded as in the case of Example 1, and thus an unstretched film with a thickness of 120 μm was formed. By use of the tenter made by Toshiba Machine Co., Ltd., thereafter, this unstretched film was stretched biaxially simultaneously, that is, three times the original size of the film in the vertical direction and three times the original size of the film in the horizontal direction (the direction in which the film ran and the direction perpendicular to the direction in which the film ran) simultaneously, in the furnace with the temperature of 120° C. Subsequently, the coating solutions 2 and 3 respectively obtained in Production Examples 2 and 3 were applied, in the order from the solution 3, the solution 2 to the solution 3, to the surface of the resultant biaxially stretched film by use of the offset gravure method, followed by drying. Thus, a biaxially stretched coated PET film with a thickness of approximately 15 μm was obtained. (Thicknesses of the layers PET, (c), (a) and (c) were 13 μm, 1 μm, 0.3 μm and 1 μm respectively.)

Reference Example 8

PET resin similar to that used in Example 1 was extruded as in the case of Example 1, and thus an unstretched film with a thickness of 120 μm was formed. By use of the tenter made by Toshiba Machine Co., Ltd., thereafter, this unstretched film was stretched biaxially simultaneously, that is, three times the original size of the film in the vertical direction and three times the original size of the film in the horizontal direction (the direction in which the film ran and the direction perpendicular to the direction in which the film ran) simultaneously, in the furnace with the temperature of 120° C. Then, the resultant biaxially stretched film was wound into a roll. Subsequently, this biaxially stretched film was brought into the coating line. Thereafter, the coating solutions 1 to 3 respectively obtained in Production Examples 1 to 3 were applied, in the order from the solution 1, the solution 2 to the solution 3, to the resultant biaxially stretched film by use of the offset gravure method, followed by drying. Thus, a biaxially stretched coated PET film with a thickness of approximately 14 μm was obtained. (Thicknesses of the layers PET, (d), (a) and (c) were 13 μm, 0.1 μm, 0.3 μm and 1 μm respectively.)

Reference Example 9

PET resin similar to that used in Example 1 was extruded as in the case of Example 1, and thus an unstretched film with a thickness of 120 μm was formed. By use of the tenter made by Toshiba Machine Co., Ltd., thereafter, this unstretched film was stretched biaxially simultaneously, that is, three times the original size of the film in the vertical direction and three times the original size of the film in the horizontal direction (the direction in which the film ran and the direction perpendicular to the direction in which the film ran) simultaneously, in the furnace with the temperature of 120° C. Then, the resultant biaxially stretched film was wound into a roll. Subsequently, this biaxially stretched film was brought into the coating line. Thereafter, the coating solutions 2 and 3 respectively obtained in Production Examples 2 and 3 were applied, in the order from the solution 2 to the solution 3, to the resultant biaxially stretched film by use of the offset gravure method, followed by drying. Thus, a biaxially stretched coated PET film with a thickness of approximately 14 μm was obtained. (Thicknesses of the layers PET, (a) and (c) were 13 μm, 0.3 μm and 1 μm respectively.)

Reference Example 10

PET resin similar to that used in Example 1 was extruded as in the case of Example 1, and thus an unstretched film with a thickness of 120 μm was formed. By use of the tenter made by Toshiba Machine Co., Ltd., thereafter, this unstretched film was stretched biaxially simultaneously, that is, three times the original size of the film in the vertical direction and three times the original size of the film in the horizontal direction (the direction in which the film ran and the direction perpendicular to the direction in which the film ran) simultaneously, in the furnace with the temperature of 120° C. Then, the resultant biaxially stretched film was wound into a roll. Subsequently, this biaxially stretched film was brought into the coating line. Thereafter, the coating solutions 2 and 3 respectively obtained in Production Examples 2 and 3 were applied, in the order from the solution 3, the solution 2 to the solution 3, to the resultant biaxially stretched film by use of the offset gravure method, followed by drying. Thus, a biaxially stretched coated PET film with a thickness of approximately 14 μm was obtained. (Thicknesses of the layers PET, (c), (a) and (c) were 13 μm, 1 μm, 0.3 μm and 1 μm respectively.)

The biaxially stretched laminate films respectively obtained by carrying out the methods of Reference Examples 1 to 10 were regarded as having no cracks in their coated layers. Polyacrylic acid contained in each of the biaxially stretched laminate films was not stretched. However, the oxygen-gas permeabilities of the respective biaxially stretched laminate films were in a range of 10 to 20 $cm^3$ (STP)/($m^2 \cdot day \cdot MPa$) (at 30° C. at a relative humidity of 80%). The biaxially stretched laminate films exhibited excellent oxygen-gas barrier properties. In addition, in the cases of Reference Examples 1 to 7, the stretch with heat was performed after the application by use of the in-line coating method. Thereby, the methods of Reference Examples 1 to 7 showed extremely high productivities per unit time.

Comparative Example 1

A biaxially stretched coated PET film with a thickness of approximately 14 μm was obtained as in the case of Example 12, except that, with regard to the amount of glycerin to be added, 35 mass parts of the 3-percent-by-mass aqueous glycerin solution was added to 65 mass parts of the 3-percent-by-mass aqueous polyacrylic acid when Production Example 2 (of producing the coating liquid containing the polyacrylic acid and the plasticizer) was carried out. The biaxially stretched coated PET film (thicknesses of the layers PET, (a) and (c) were 13 μm, 0.1 μm and 1 μm respectively) obtained through carrying out this method did not have cracks in its coated layer. However, since the amount of the glycerin added was too much, the oxygen permeability was deteriorated to 1200 $cm^3$(STP)/($m^2 \cdot day \cdot MPa$)

Comparative Example 2

A biaxially stretched laminate film (thicknesses of the layers PET, (a), (d) and (c) were 13 μm, 0.3 μm, 0.1 μm and 1 μm respectively) was produced as in the case of Example 2, except that the coating solutions respectively obtained in Production Examples 1 to 3 were applied, in the order from the solution 2, the solution 1 to the solution 3, to the uniaxially stretched film. In this case, the layer (a) and the layer (c) were not adjacent to each other. The oxygen permeability of this stretched laminate film was 1500 $cm^3$ (STP)/($m^2 \cdot day \cdot MPa$)

TABLE 1-1

| | Total thickness (μm) pre-stretched/ | Whether or | Whether or not are there |

|  | Thermoplastic resin layer (b) | Sequence of applying and stretching processes | | | | | post-dried Layer (a) | not is Layer (c) | layer (a) stretched? | cracks in coated layer? | Oxygen permeability | Note |
|  |  | Application | Stretch | Application | Stretch | Application |  |  |  |  |  |  |
| --- | --- | --- | --- | --- | --- | --- | --- | --- | --- | --- | --- | --- |
| Ex. 1 | PET | No | Vertical | d/a | Horizontal | c | 1/0.3 | 1 | Stretched | None | 2.0 | In-line |
| Ex. 2 | PET | No | Vertical | d/a/c | Horizontal | No | 1/0.3 | 3/1 | Stretched | None | 2.0 | In-line |
| Ex. 3 | PET | d | Vertical | a | Horizontal | c | 1/0.3 | 1 | Stretched | None | 2.0 | In-line |
| Ex. 4 | PET | d | Vertical | a/c | Horizontal | No | 1/0.3 | 3/1 | Stretched | None | 2.0 | In-line |
| Ex. 5 | PET | d/a | Vertical | c | Horizontal | No | 1/0.1 | 3/1 | Stretched | None | 2.0 | In-line |
| Ex. 6 | PET | d/a | Biaxial simultaneous | c | No | No | 1/0.1 | 1 | Stretched | None | 2.0 | In-line |
| Ex. 7 | PET | d/a/c | Biaxial simultaneous | No | No | No | 1/0.1 | 5/0.5 | Stretched | None | 2.0 | In-line |
| Ex. 8 | PET | d/a/c | Wound in a roll | No | Biaxial simultaneous | No | 1/0.1 | 5/0.5 | Stretched | None | 2.0 | Off-line |
| Ex. 9 | Ny | d/a/c | Biaxial simultaneous | No | No | No | 1/0.1 | 5/0.5 | Stretched | None | 30 | In-line |
| Ex. 10 | PP | d/a/c | Biaxial simultaneous | No | No | No | 1/0.1 | 5/0.5 | Stretched | None | 2.0 | In-line |
| Ex. 11 | PET | No | Vertical | a/c | Horizontal | No | 1/0.3 | 3/1 | Stretched | None | 2.0 | In-line |
| Ex. 12 | PET | a | Vertical | c | Horizontal | No | 1/0.1 | 3/1 | Stretched | None | 2.0 | In-line |
| Ex. 13 | PET | a/c | Biaxial simultaneous | No | No | No | 1/0.1 | 5/0.5 | Stretched | None | 2.0 | In-line |
| Ex. 14 | PET | a/c | Wound in a roll | No | Biaxial simultaneous | No | 1/0.1 | 5/0.5 | Stretched | None | 2.0 | Off-line |
| Ex. 15 | PET | No | Vertical | c/a | Horizontal | c | 1/0.3 | 4/2 | Stretched | None | 2.0 | In-line |
| Ex. 16 | PET | No | Vertical | c/a/c | Horizontal | No | 1/0.3 | 6/2 | Stretched | None | 2.0 | In-line |
| Ex. 17 | PET | c | Vertical | a | Horizontal | c | 1/0.3 | 6/1.5 | Stretched | None | 2.0 | In-line |
| Ex. 18 | PET | c | Vertical | a/c | Horizontal | No | 1/0.3 | 8/1.5 | Stretched | None | 2.0 | In-line |
| Ex. 19 | PET | c/a | Vertical | c | Horizontal | No | 1/0.1 | 8/1.5 | Stretched | None | 2.0 | In-line |
| Ex. 20 | PET | c/a | Biaxial simultaneous | c | No | No | 1/0.1 | 8/1.5 | Stretched | None | 2.0 | In-line |
| Ex. 21 | PET | c/a/c | Biaxial simultaneous | No | No | No | 1/0.1 | 10/1 | Stretched | None | 2.0 | In-line |
| Ex. 22 | PET | c/a/c | Wound in a roll | No | Biaxial simultaneous | No | 1/0.1 | 10/1 | Stretched | None | 2.0 | Off-line |

TABLE 1-2

| | Thermoplastic resin layer (b) | Sequence of applying and stretching processes | | | | | Total thickness (μm) pre-stretched/ post-dried | | Whether or not layer (a) stretched? | Whether or not are there cracks in coated layer? | Oxygen permeability | Note |
|---|---|---|---|---|---|---|---|---|---|---|---|---|
| | | Application | Stretch | Application | Stretch | Application | Layer (a) | Layer (c) | | | | |
| Ref. Ex. 1 | PET | No | Vertical | d | Horizontal | a/c | 0.3 | 1 | Unstretched | None | 20 | In-line |
| Ref. Ex. 2 | PET | d | Biaxial simultaneous | a/c | No | No | 0.3 | 1 | Unstretched | None | 20 | In-line |
| Ref. Ex. 3 | PET | No | Biaxial simultaneous | d/a/c | No | No | 0.3 | 1 | Unstretched | None | 20 | In-line |
| Ref. Ex. 4 | PET | No | Biaxial simultaneous | a/c | No | No | 0.3 | 1 | Unstretched | None | 20 | In-line |
| Ref. Ex. 5 | PET | No | Vertical | c | Horizontal | a/c | 0.3 | 4/2 | Unstretched | None | 20 | In-line |
| Ref. Ex. 6 | PET | No | Biaxial simultaneous | a/c/a | No | No | 0.6 | 1 | Unstretched | None | 10 | In-line |
| Ref. Ex. 7 | PET | No | Biaxial simultaneous | c/a/c | No | No | 0.3 | 2 | Unstretched | None | 20 | In-line |
| Ref. Ex. 8 | PET | No | Biaxial simultaneous | Wound in a roll | No | d/a/c | 0.3 | 1 | Unstretched | None | 20 | Off-line |
| Ref. Ex. 9 | PET | No | Biaxial simultaneous | Wound in a roll | No | a/c | 0.3 | 1 | Unstretched | None | 20 | Off-line |
| Ref. Ex. 10 | PET | No | Biaxial simultaneous | Wound in a roll | No | c/a/c | 0.3 | 2 | Unstretched | None | 20 | Off-line |
| Comp. Ex. 1 | PET | a | Vertical | c | Horizontal | No | 1/0.1 | 3/1 | Stretched | None | 1200 | In-line |
| Comp. Ex. 2 | PET | No | Vertical | a/d/c | Horizontal | No | 1/0.3 | 3/1 | Stretched | None | 1500 | In-line |

INDUSTRIAL APPLICABILITY

The present invention makes it possible to provide a laminate film which has been stretched (also referred to as a "stretched laminate film), and which includes a layer made of a thermoplastic resin and at least one layer forming unit where a layer made of a polycarboxylate-based polymer including a plasticizer and a layer made of a multivalent metal compound are adjacent to each other. The present invention also makes it possible to provide a method of producing the laminate film. Since the evenly stretched, thin coated layer made of the polycarboxylate-based polymer including the plasticizer and the layer made of the multivalent metal compound are adjacent to each other, the stretched laminate film exhibits excellent oxygen-gas barrier properties. Particularly, since the application and the stretch with heat are performed in an integrated manner starting from the formation of the thermoplastic resin serving as the substrate, the present invention makes it possible to provide the stretched laminate film with high productivities. Moreover, by means of carrying out the applying step and the stretching step according to the producing method of the present invention the layer formed from the polycarboxylate-based polymer including the plasticizer can be made thinner, although making the layer thinner has been difficult to achieve as long as only the application is carried out.

The invention claimed is:

1. A method of producing a stretched laminate film with oxygen-gas barrier properties, which includes a layer (a) formed from a composition of a polycarboxylate-based polymer (A) and a plasticizer (B), a layer (c) containing a multivalent metal compound (C) and a layer (b) formed from a thermoplastic resin, and which includes at least one layer forming unit where the layer (a) and the layer (c) are adjacent to each other, the method comprising the steps of:

superposing at least one of the layer (a) and the layer (c) on at least one surface of the layer (b) by a coating process; and stretching a laminate film including the layer (a), the layer (b) and the layer (c) in an integrated manner and with a surface stretch ratio of 1.1 to 100.

2. The method of producing a stretched laminate film according to claim 1, wherein a compositional mass ratio of the polycarboxylate-based polymer (A) to the plasticizer (B) is 99.9/0.1 to 70/30.

3. The method of producing a stretched laminate film according to claim 1, wherein the plasticizer (B) is polyalcohol.

4. The method of producing a stretched laminate film according to claim 1, wherein the laminate film is stretched after applying the layer (c) to a surface obtained by applying the layer (a) to the layer (b), or after applying the layer (a) to a surface obtained by applying the layer (c) to the layer (b).

5. The method of producing a stretched laminate film according to claim 1, wherein at least one of the layer (a) and the layer (c) is applied to at least one surface of the layer (b) formed from an unstretched thermoplastic resin which has been melted and extruded, and the laminate film obtained by the application is stretched in one direction, and wherein, in a case where the layer (a) is applied thereto, the layer (c) which is adjacent to the layer (a), and which, along with the layer (a), constitutes the layer forming unit, is subsequently applied to the applied layer (a), and then is stretched in a direction perpendicular to the direction in which the layer (a) has been stretched, or wherein, in a case where the layer (c) is applied thereto, the layer (a) which is adjacent to the layer (c), and which, along with the layer (c), constitutes the layer forming unit, is subsequently applied to the applied layer (c), and then is stretched in a direction perpendicular to the aforementioned direction in which the layer (c) has been stretched.

6. The method of producing a stretched laminate film according to claim 1,
wherein the layer (a) and the layer (c) are applied to at least one surface of the layer (b) formed from an unstretched thermoplastic resin which has been melted and extruded, and thereafter the laminate film obtained by the application is stretched in a direction in which the film runs and in a direction perpendicular to the direction in which the film runs at the same time.

* * * * *